(12) United States Patent
Charbit et al.

(10) Patent No.: US 8,749,638 B2
(45) Date of Patent: Jun. 10, 2014

(54) MAPPING METHOD IN A GEOGRAPHICAL TRACKING AREA FOR TELEVISION WHITE SPACE BANDS

(75) Inventors: Gilles Charbit, Farnborough (GB); Samuli Turtinen, Ii (FI); Sami-Jukka Hakola, Kempele (FI); Timo Koskela, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/184,002

(22) Filed: Jul. 15, 2011

(65) Prior Publication Data
US 2013/0016221 A1    Jan. 17, 2013

(51) Int. Cl.
| | |
|---|---|
| H04N 17/00 | (2006.01) |
| H04N 17/02 | (2006.01) |
| H04N 5/50 | (2006.01) |
| H04W 4/00 | (2009.01) |
| H04L 12/66 | (2006.01) |
| H04N 7/173 | (2011.01) |

(52) U.S. Cl.
USPC ........... 348/180; 348/192; 348/731; 348/735; 370/329; 370/352; 725/109

(58) Field of Classification Search
None
See application file for complete search history.

(56) References Cited

U.S. PATENT DOCUMENTS

| | | | |
|---|---|---|---|
| 2007/0189205 A1* | 8/2007 | Terry et al. .................... 370/328 |
| 2009/0217333 A1* | 8/2009 | Young et al. .................. 725/109 |
| 2010/0195590 A1* | 8/2010 | Park .............................. 370/329 |
| 2011/0019104 A1* | 1/2011 | Kwak et al. ................... 348/731 |
| 2011/0096770 A1* | 4/2011 | Henry ........................... 370/352 |
| 2011/0164581 A1* | 7/2011 | Keon ............................. 370/329 |
| 2011/0317019 A1* | 12/2011 | Bahl et al. ..................... 348/180 |
| 2012/0093092 A1* | 4/2012 | Kasslin et al. ................ 370/329 |

FOREIGN PATENT DOCUMENTS

| | | |
|---|---|---|
| WO | WO 2010/111150 A2 | 9/2010 |
| WO | WO 2011/047694 A1 | 4/2011 |
| WO | WO 2011/140462 A2 | 11/2011 |

OTHER PUBLICATIONS

Combined Search and Examination Report from Great Britain Application No. 1112251.2, dated Nov. 3, 2011.
Muhammad Imadur Rahman, et al.; "License-exempt LTE systems for secondary spectrum usage: Scenarios and first assessment"; IEEE International Symposium on New Frontiers in Dynamic Spectrum Access Networks; (AACHEN): 2011. 05.03-06 DYSPAN; (AACHEN): 2011. 05.03-06 IEEE International Symposium on Dynamic Spectrum Access Networks; (AACHEN): 2011.05.03-06, Piscataway, NJ; May 3, 2011, pp. 349-358; XP0319539894.
International Search Report from International Patent Application No. PCT/IB2012/053630, mailed Nov. 8, 2012

* cited by examiner

*Primary Examiner* — Jefferey Harold
*Assistant Examiner* — Sean Haiem
(74) *Attorney, Agent, or Firm* — Stanton IP Law

(57) ABSTRACT

The present invention discloses an apparatus, a method and a computer program for mapping and allocating available television white space channels for a terminal requesting resources. The mapping is based on the data of available overlapping TV white space channels within a geographical tracking area and coexistence with other cellular secondary systems within the area. Furthermore, a location for a moving mode II device may be tracked periodically. The geo-location accuracy of the mode II device affects the TV white space resources which can be allocated to the device.

17 Claims, 1 Drawing Sheet

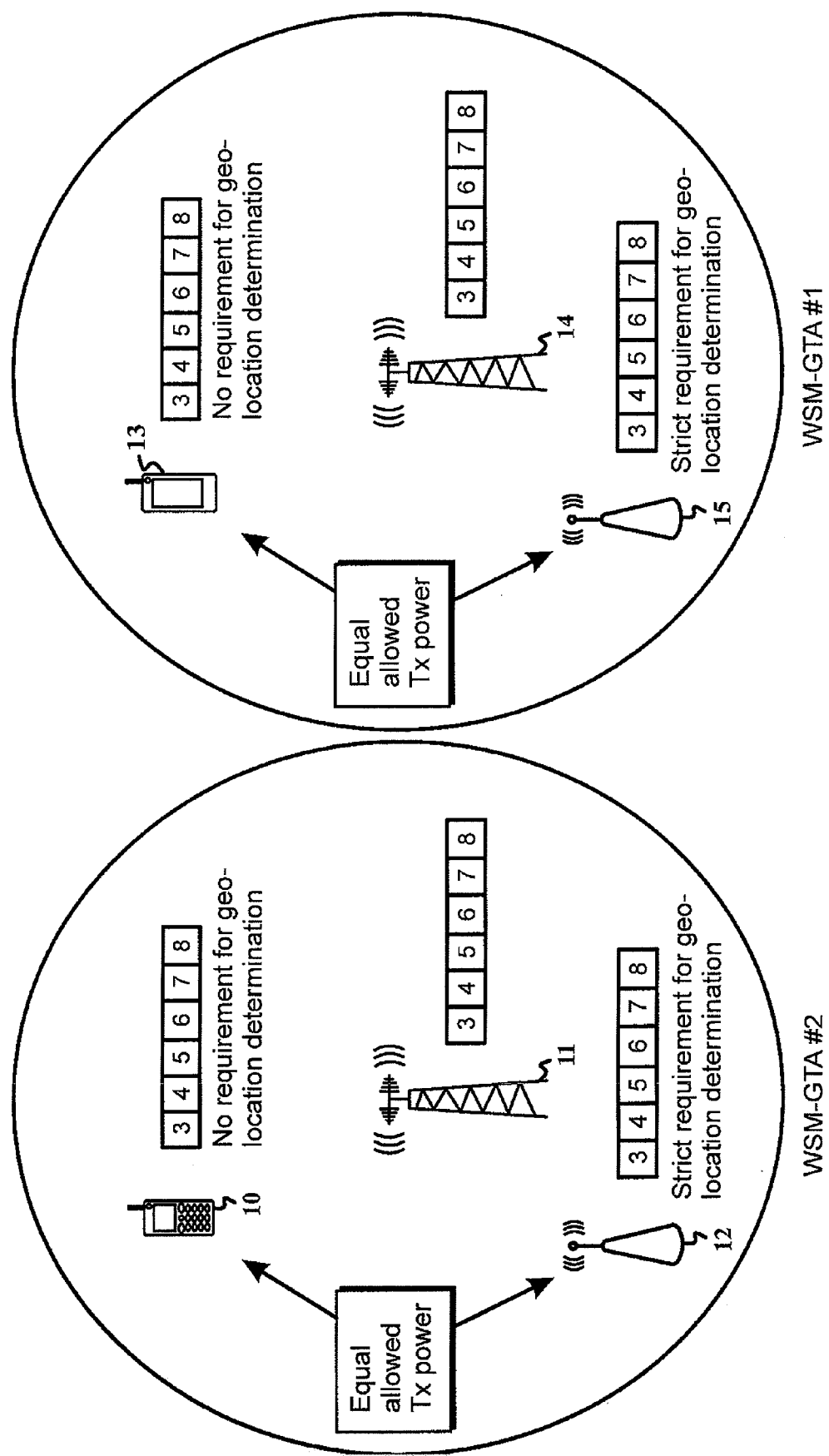

MAPPING METHOD IN A GEOGRAPHICAL TRACKING AREA FOR TELEVISION WHITE SPACE BANDS

BACKGROUND OF THE INVENTION

1. Field of the Invention

The present invention relates to mobile communication networks, and especially to LTE-A (Long Term Evolution) cellular communications in license-exempt TV White Spaces (TVWS) bands, where non-cellular systems such as WiFi (IEEE 802.11 standard), Zigbee (IEEE 802.15), BlueTooth, and USB wireless systems may co-exist.

2. Description of the Related Art

In mobile communication networks, different frequency bands form a resource tightly governed between different users and applications. The governing institutions include several standardizing organizations and e.g. in the USA, the governing institution is the Federal Communications Commission (FCC). Therefore, specific bands are allocated for third (3G) and fourth generation (4G) cellular wireless networks and for WLAN usage. Also, there are specific frequency bands allocated e.g. for TV broadcasting. Generally it can be considered that for any specified specific mobile communication application, some parts of the spectrum are licensed for it and the rest of the spectrum forms unlicensed bands for the application.

An unlicensed band is basically a shared spectrum where one needs to accept interference from other unknown systems and sources such as in ISM (Industrial, Scientific and Medical) bands. As licensed band operation has been increasingly utilized, portions of the radio spectrum that remain available have become limited. Therefore, operators, service providers, communication device manufacturers, and communication system manufacturers, are all seeking efficient solutions to utilize unlicensed shared bands. Communication on an unlicensed shared band has been generally based on sharing an available radio channel between different communication devices. Different communication devices may utilize a common radio access technology (RAT), but it is also possible that different communication devices utilize different RATs which may have different kinds of limitations and different rules in their operation. In an unlicensed shared band, channel access can be distributed in a manner, where communication devices can be configured to detect a channel, and utilize a channel reservation scheme known to other communication devices in order to reserve a right to access the channel.

A potential and attractive spectrum resource is the TV white space (TVWS) band which generally mean all frequency bands allocated for television broadcast signals but which are locally free in a certain geographical area.

The FCC has defined two concepts for helping to find available channels; a TV band database and a geo-location capability. A TV band database that maintains records of all authorized services in the TV frequency bands, is capable of determining the available channels according to a specific geographic location and it provides lists of available channels to TV Band Devices (TVBD) that have been certified under the FCC's equipment authorization procedures. The geo-location capability is defined for some of the TVBDs. A TVBD with such a capability should be able to determine its geographic coordinates within certain level of accuracy, which can be e.g. ±50 m. The geo-location capability is used with a TV band database to determine the availability of TV channels at a location of the TVBD.

Several types of TVBDs have been defined by FCC based on their characteristics. In the USA, the general frequency range for television use is between 54-698 MHz.

The first type of TVBDs is a fixed device. A fixed TVBD is located at a specified fixed location. The fixed TVBD is able to select a channel from the TV band database. Furthermore, it is able to initiate and operate a network by sending enabling signals to other fixed TVBDs or personal/portable TVBDs. Additionally, it is able to provide a list of available channels to a Mode I personal/portable device (see below) on which the Mode I device may operate, especially a supplemental list of available channels for Mode I devices. Such a supplemental list may contain available TV channels that are adjacent to occupied TV channels, for which the fixed TVBDs cannot operate. For instance, the fixed device may be an access point.

The second type of TVBDs is a Mode I personal/portable device. Such a device does not use any internal geo-location capability or access to a TV band database, so it must obtain a channel list from either a fixed TVBD or from Mode II personal/portable TVBD (see below). This kind of device may work only as a client/slave, but not as a master device.

The third type of TVBDs is a Mode II personal/portable device. A Mode II personal/portable device has similar functions as the fixed TVBD, but it does not need to transmit or receive signals at a specified and fixed place. This kind of TVBD can also be an access point, for instance.

The fourth type of TVBDs is a sensing only device. It is a personal/portable TVBD that uses spectrum sensing for determining a list of available channels. It can use frequency bands 512-608 MHz (in USA, TV channels 21-36) and 614-698 MHz (US TV channels 38-51). It is notable that the spectrum sensing is only defined for personal/portable TVBDs.

The transmission power limits are standardized as follows. For fixed TVBDs, the maximum power delivered to the transmitting (TX) antenna shall not exceed 1 W. For personal/portable TVBDs, the maximum effective isotropic radiated power (EIRP) is 100 mW (20 dBm). If the personal/portable TVBD does not meet the adjacent channel separation requirements (the distance between the TVBD and the TV station is smaller than the minimum distance requirement), the maximum EIRP is set to 40 mW (16 dBm).

The maximum power spectral densities (for any 100 kHz band during any time interval of continuous transmission) for different types of TVBDs are standardized for fixed devices as 12.2 dBm, for personal/portable devices operating adjacent to occupied TV channels as −1.6 dBm, for sensing only devices as −0.8 dBm and for all other personal/portable devices as 2.2 dBm.

IEEE technologies represent an attractive choice for the TVWS due to their listen-before-talk nature to provide an inbuilt Physical Layer (PHY)/Medium Access Control (MAC) level co-existence in the unlicensed spectrum. The IEEE projects like 802.22, 802.11af, 802.19.1 and 1900.4a have undertaken actions to address the White Space issues from different points of view.

Solutions for the deployment of LTE wireless nodes such as macro or micro eNodeB:s (eNBs; LTE base stations), pico eNBs, and Home eNBs in heterogeneous networks using the same spectrum are being investigated in 3GPP Release 10 (RP-100383, "New Work Item Proposal: Enhanced ICIC for non-CA based deployments of heterogeneous networks for LTE", RAN #47, March 2010). Re-use of Release 8/9 techniques, backward compatibility for Release 8/9 terminals, and minimum impact of physical layer air interface are key drivers.

To prevent licensed spectrum scarcity to become a bottleneck for heterogeneous networks due to inter-node interference, LTE systems could be deployed in TV White Space (TVWS) bands with the licensed band resources being used during the initial setup. In the USA, the FCC has regulated licensed or license-exempt TV bands for the secondary-system applications (i.e. cellular, WiFi, WiMax) on TVBDs.

The following table gives the available TVWS bands in the US (see FCC 10-174, "SECOND MEMORANDUM OPINION AND ORDER", Sep. 23, 2010). Each TV channel has a 6 MHz bandwidth and it would typically be sufficient for any kind of wireless communication.

| Frequency Range (corresponding TV channel numbers) | Center Frequency | Available bandwidth |
| --- | --- | --- |
| 54-60 MHz (2) | 57 MHz | 6 MHz |
| 76-88 MHz (5, 6) | 82 MHz | 12 MHz |
| 174-216 MHz (7-13) | 195 MHz | 42 MHz |
| 470-608 MHz (14-36) | 539 MHz | 138 MHz |
| 614-698 MHz (38-51) | 656 MHz | 84 MHz |

Most applications in the TV bands are primary applications in some or all the channels, including TV services, Wireless Medical Telemetry Service (WMTS) and radio astronomy, Private Land Mobile Radio Service (PLMRS) and the Commercial Mobile Radio Service (CMRS), and regional based services. In addition, there are also some existing secondary systems such as wireless microphone (channel 7-46) and unlicensed remote control devices (above channel 4).

In prior art, NICT 11-10-1234 ("Channel list request/response for multiple geo-locations", IEEE 802.11af, October 2010) proposed conditional access to TVWS for the mode II device to check its location every minute (via GPS or some other way), then check if it locates outside the boundary. If it locates inside the boundary, the device doesn't contact the TVWS database. The boundary is determined from operating geographical areas based on operating channels and indicated in WSM IE (White Space Mapping) for current geo-location (accuracy within ±50 m) using available TVWS channel list WSM1 and vicinity geo-location (accuracy less ±50 m) using available TVWS channel list WSM2. This allows the device to check its position in every 60 seconds based on FCC requirements and to contact the database only if its location is outside the signaled geographical areas. The TVWS database may then need to be queried only every 24 hours.

COGEU ("Cognitive radio systems for efficient sharing of TV white spaces in European context") has proposed a practical approach for geo-location of TVBDs in geographical area (COGEU, FP7 ICT-2009.1.1, D4.1 Spectrum measurements and anti-interference spectrum database specification, 15 Sep. 2010). They recognized that determining that a geographical area is available for White Space Devices (WSD), radio communication depends on signal strength measured at different locations around a given location and compared to some threshold values to establish that the TVBD location probability corresponds to a 70%, 90% or 95% area cell coverage with cell sizes 100 m×100 m, 200 m×200 m or 500 m×500 m, respectively. A geo-location database would work with such a grid, where the device may inform the database on used localization technology, e.g. GPS, cellular based solution Evolved Observed Time Difference Of Arrival (E-OT-DOA) using tri-lateration (based on distances) or network-based cell Identity+Timing Advance (cell ID+TA) using triangulation (based on directions). The database may subsequently use a look-up table to ascertain the correct location accuracy. Interference margin to reduce the coverage of the area may be used based on the accuracy of the geo-location, i.e. there may be a smaller list of available TVWS channels within the geographical area. LTE interference to primary systems has also been extensively analyzed. Initial access to the geo-location database by TVBDs by using existing radio interfaces, such as WiFi, LTE or WiMax, has been briefly mentioned in the COGEU approach.

The European Conference of Postal and Telecommunications Administrations (CEPT) has indicated that the geographic area covered by a geo-location database is represented as pixels which are areas of predetermined dimensions (see CEPT/ECC Draft Report 159: "Technical and operational requirements for the possible operation of cognitive radio systems in the White spaces of the frequency band 470-790 MHz"). Each pixel is associated with a list of available frequencies and other relevant data that are provided to cognitive devices querying the database. The exact dimensions of a pixel may depend on planning decisions made in populating the database. The main purpose of using geo-location database for WSD is to ensure that there is no harmful interference from the WSD to the protected services. This is achieved by sharing minimum amount of information between devices and the database to ensure the correct calculation of available channels. In that sense, the CEPT requirements are more flexible than the FCC fixed requirement for geo-location accuracy of ±50 m.

The problematic issue of the prior art is handled in the following. To help the TVBDs find available channels, the FCC has introduced the following issues. TVWS database is available online by the TVBDs (typically via internet connection) that indicate the available channels as a specific geographic location. TVBD geo-location capability is available using GPS or other adequate positioning methods within required accuracy of ±50 m. This is used with the TVWS database to check the available TV channels at a TVBD's location.

In addition, the FCC has defined the following requirements for TVBD types. Fixed TVBDs are located at a specified fixed location and must access to TV band database at least once a day to verify the channel availability. Their scheduling information has to be updated at least in every 48 hours. Mode II TVBDs have to check their locations at least every 60 seconds (except in the sleep mode, when the device is inactive but not powered off) and access the TVWS database if the location has changed either through a direct connection (e.g. via DSL line) or through an indirect connection (e.g. via fixed TVBD or another Mode II TVBD). Mode I TVBDs must either receive a contact verification signal from Mode II or fixed device or contact a Mode II or fixed device to re-verify/re-establish channel availability in at least once in every 60 s period. Sensing only TVBDs use spectrum sensing to determine a list of available channels. They can use the frequency bands 512-608 MHz (US TV channels 21-36) and 614-698 MHz (US TV channels 38-51). Spectrum sensing is only defined for personal/portable TVBDs.

These mechanisms aim to set up TVBD connections in TVWS channels when not used by the primary systems, but they have the following limitations. Geo-location requirement of ±50 m for Mode II device may be difficult to achieve by practical position methods, e.g. GPS, if locating indoors without good line-of-sight (LOS) to several satellites, or cellular positioning techniques such as OTDOA. In addition, in case the available TVWS channel covers a large area (i.e. radius of $>>50$ m), accessing the TVWS database could be done on a need basis to reduce White Space Mapping (WSM)

signaling only if Mode II device leaves the available TVWS channel coverage. Furthermore, these mechanisms do not apply to secondary systems. Cellular network operators may have cellular database showing their coverage accurately, but they are unlikely to allow any competitors to use them. WiFi database including home WiFi networks is not a likely solution.

There is a need to find a solution that allows, on the one hand, to re-use existing mechanisms (i.e. TVWS database, TVBD geo-location) to check that TVWS channels are not used by any primary systems in efficient way, while on the other hand, it is needed to determine whether available TVWS channels are also free from other secondary-system interference.

SUMMARY OF THE INVENTION

The present invention introduces a method, which comprises requesting data of available television white space channels in a geographical tracking area by a television band device, identifying available television white space channels and base stations of at least one cell within the geographical tracking area, by positioning the television band device, and defining and allocating at least one available television white space channel for the television band device as a response for the request.

In an embodiment of the invention, the method further comprises checking co-existence of cellular secondary systems in the geographical tracking area.

In an embodiment of the invention, the method further comprises determining the available overlapping television white space channels based on at least the geo-location accuracy of the apparatus and a cell neighbor list.

In an embodiment of the invention, the method further comprises evaluating the request according to its geographical tracking area filtering rule using the cell neighbor list, and connecting to the television white space database on behalf of the television band device to request a list of available television white space channels or overlapping television white space channels in the geographical tracking area.

In an embodiment of the invention, the method further comprises configuring network resources for the base station based on the location of the base station, the cell neighbor list and interfering other network base stations in an overlapping television white space channel.

In an embodiment of the invention, the method further comprises selecting a television white space channel for the television band device where a lowest signal power transmitted from other network base stations is received.

In an embodiment of the invention, the method further comprises locating the position of a television band device by Global Positioning System, by Evolved Observed Time Difference Of Arrival or by cell Identity and Timing Advance method.

In an embodiment of the invention, the method further comprises checking the location for a mode II device between predetermined periods of time, and defining the at least one available television white space channel for the mode II device based on location accuracy.

According to another aspect of the invention, there is provided an apparatus, which comprises receiving means configured to receive a request of available television white space channels in a geographical tracking area, from at least one television band device, processing means configured to identify available television white space channels and base stations of at least one cell within the geographical tracking area, by positioning the television band device, and the processing means is configured to define and allocate at least one available television white space channel for the television band device as a response for the request.

In an embodiment of the invention, the apparatus further comprises secondary user co-ordination means configured to co-ordinate cellular secondary user co-existence on television white space channels at the geographical tracking area.

In an embodiment of the invention, the apparatus further comprises the processing means configured to determine the available overlapping television white space channels based on at least the geo-location accuracy of the apparatus and a cell neighbor list.

In an embodiment of the invention, the apparatus further comprises the processing means configured to evaluate the request according to its geographical tracking area filtering rule using the cell neighbor list, and the apparatus configured to connect to the television white space database on behalf of the television band device to request a list of available television white space channels or overlapping television white space channels in the geographical tracking area.

In an embodiment of the invention, the apparatus further comprises configuring means for configuring network resources for the base station based on the location of the base station, the cell neighbor list and interfering other network base stations in an overlapping television white space channel.

In an embodiment of the invention, the apparatus further comprises the apparatus configured to select a television white space channel for the television band device where a lowest signal power transmitted from other network base stations is received.

In yet another aspect of the invention, the present invention comprises a network, comprising at least one base station, at least one television band device, and an apparatus for television white space mapping for the at least one television band device.

In an embodiment of the invention, the network comprises a secondary system television white space server connectable with the apparatus, the server configured to co-ordinate cellular secondary user co-existence on television white space channels at the geographical tracking area.

In an embodiment of the invention, the network comprises positioning means configured to locate the television band device by Global Positioning System, by Evolved Observed Time Difference Of Arrival or by cell Identity and Timing Advance method.

In an embodiment of the invention, the network comprises the positioning means configured to check the location for a mode II device between predetermined periods of time, and the apparatus configured to define the at least one available television white space channel for the mode II device based on location accuracy.

According to yet another aspect of the invention, there is provided a computer program comprising code adapted to perform the following steps, when executed on a data-processing system. These steps comprise:

requesting data of available television white space channels in a geographical tracking area by a television band device;

identifying available television white space channels and base stations of at least one cell within the geographical tracking area, by positioning the television band device; and defining and allocating at least one available television white space channel for the television band device as a response for the request.

In an embodiment of the invention, the computer program is stored on a computer readable medium.

It is possible to combine one or more of the embodiments and aspects disclosed above to form one or more further embodiments of the present invention.

BRIEF DESCRIPTION OF THE DRAWINGS

The accompanying drawing, which is included to provide a further understanding of the invention and constitute a part of this specification, illustrates embodiments of the invention and together with the description helps to explain the principles of the invention. The examples shown in the drawing are not the only possible embodiments of the invention and the invention is not considered to be limited to the presented embodiments. In the drawings:

FIG. 1 illustrates the principle of the WSM GTA according to the invention.

DETAILED DESCRIPTION OF THE EMBODIMENTS

Reference will now be made in detail to the embodiments of the present invention, examples of which are illustrated in the accompanying drawing.

The present invention introduces a method, an apparatus and a network for allocating a television white space channel for a TV band device, with a help of geo-positioning and also, by taking possible secondary system interference into account.

In the present invention, it is assumed that the mode II device can be, e.g. a Femto Access Point with LTE local-area capability or it can connect to a mode II device being e.g. a Femto Access Point on an available TVWS channel in the TVWS band. It is further assumed that the mode II device can connect to a wide-area LTE eNB on a cellular band as a normal LTE User Equipment (UE) to set up a cell in a TVWS band. An embodiment of the present invention is outlined in the following procedure.

As a first step in this embodiment of the invention, available overlapping TVWS channels within WSM GTA are identified. At first the mode II device accesses the TVWS database via the LTE network acting as "proxy". The TVWS database determines a list of available TVWS overlapping channels in White Space Mapping Geographical Tracking Area (WSM-GTA) based on the mode II device geo-location accuracy and LTE cell neighbor list. TVWS database indicates in the channel list response an information element (IE) to the LTE "proxy" which forwards to the mode II device the following lists:

(i) the TVWS channel list WSM1 based on geo-location accuracy of ±50 m;

(ii) the overlapping TVWS channel list, WSM2, with geo-location based on LTE cell coverage accuracy; and (iii) the eNB IDs of the LTE cell within the WSM GTA or alternatively, these eNB IDs are added to the IE by the LTE "proxy" to allow more efficient TVWS database signaling, as this information is already stored in the Mobile Management Entity (MME).

At the second phase of this embodiment, co-existence with other cellular secondary systems within WSM GTA is checked. The LTE Mobile Management Entity-Non-Access Stratum (MME-NAS) within the WSM GTA configures resources to mode II devices in a TVWS band via higher layer signaling on cellular band based on the following:

(i) Mode II device location.

(ii) LTE cell neighbor list of the LTE-attached mode II device.

(iii) Other cellular secondary systems likely to interfere with a mode II device by indicating a list of other network eNB IDs whose position or cell coverage area matches that of the eNB IDs in the LTE home network. The cell neighbor list and overlapping TVWS channel list (WSM2) can be used. This requires some inter-network co-ordination between the LTE home network and other network (e.g. LTE, WiMax). By this way, other network eNBs will not use same overlapping TVWS channels with the own network eNBs, and thus, interference is avoided.

Furthermore, the mode II device keeps attached to the LTE eNB in case re-configuration of the resources in the TVWS band is needed, i.e. co-ordination of WSM GTAs with other operator networks is performed for avoiding inter-secondary system interference on overlapping TVWS channels.

As the third step of the procedure, a Secondary System TVWS Server (SSTS) allows network operators to co-ordinate cellular secondary user co-existence on TVWS at WSM GTA level. Furthermore, the TVWS resource configuration is transparent to the access layer, i.e. MME/NAS signaling is used with no TVWS-specific Access Stratum (AS) signaling.

The SSTS may be outside the network domain or within the network domain. This may depend on the implementation and specification of the interfaces between the SSTS and MME within a network domain or between network domains.

The mode II devices use LTE cell coverage (eNB#i in WSM-GTA) in case resources are configured on overlapping TVWS channels (WSM2 list) for more efficient positioning-related signaling, or if positioning measurements are not possible, or positioning measurements are limited by mode II device battery capacity or if the mode II device is moving. Otherwise, mode II devices can use TVWS channels based on their geo-location accuracy, which depends on the type of the positioning method and estimated position error (WSM1 list). More details on different embodiments are provided later.

To limit interference from secondary cellular systems, the mode II device may check whether other network eNBs have coverage on the overlapping TVWS channels based on their eNB IDs as signaled by the MME NAS. It may select the overlapping TVWS channels with the lowest received signal power from these other network eNBs. More details on these issues are also provided later.

Note that the cellular TVWS server is for co-existence of cellular secondary users to minimize their transmissions on TVWS channels interfering with each other. This is a different entity from the TVWS server used for determination of the available TVWS channels to minimize interference from secondary user transmissions to the primary users.

Further embodiments for the implementation comprise the LTE network acting as "proxy" for a mode II device. The LTE network is aware at the MME-NAS layer of the mode II device, as it needs to send eNB#i of the LTE cells within WSM GTA. The mode II devices are transparent to eNBs and there is no TVWS-specific AS signaling.

As a proxy, the LTE system acts as an intermediary for TVWS channel list request by the (client) mode II device which wants resources from the TVWS database. The LTE proxy evaluates the request according to its WSM GTA filtering rule using LTE cell neighbor list and connects to the TVWS database on behalf of the (client) mode II device to request the list of available TVWS channels or overlapping TVWS channels in WSM GTA. Hence, in this embodiment, the LTE system acting as a proxy is more than just a basic network access.

In the LTE system, the MME-NAS sends a list of eNB#i in WSM GTA and geo-location of mode II device to TVWS database on behalf of the client mode II device in one embodiment. Then, the TVWS database works out the overlapping TVWS channels and sends that information and the eNB#i list in the channel list response IE to LTE proxy which forwards it to the client mode II device.

In this embodiment, the LTE network operator only needs to store the LTE eNB#i cell area (i.e. co-ordinates) in the TVWS database once in every 24 hours to allow for changes in LTE coverage of LTE cells (e.g. rainy weather conditions, changes in vegetation are known factors affecting cellular coverage). This allows efficient TVWS-specific signaling, as the LTE proxy only sends the list of eNB#i within WSM GTA of mode II device's needs to TVWS database, which can work out the overlapping channels based on eNB#i IDs in WSM GTA.

The mode II devices do not need to provide the list of eNB#i in WSM-GTA. That information is already available in MME based on neighbor list for LTE cell handover. In the handover procedure, the mode II device is required to make Reference Signal Received Power (RSRP) measurements based on neighbor-cell Cell-specific Reference Signal (CRS) and report measurements to the LTE system. This allows the MME to make handover decisions for the mode II device. The mode II device may do GPS fix or Reference Signal Time Difference (RSTD) measurements in E-OTDOA and report them to the LTE network, where Evolved-Serving Mobile Location Centre (E-SMLC) entity works out its geo-location.

The E-SMLC entity may tell the MME about the location of the mode II device with its estimated accuracy. For example, if it is assumed that the GPS fix is done with a good LOS to a large number of satellites, the geo-location can be expected to be ±50 m. On the other hand, in indoor conditions or in the city center with tall buildings nearby, there may only be a good LOS to a small number of satellites, and the geo-location accuracy can be expected to be less than ±50 m. If it is assumed that E-OTDOA is done with a good Positioning Reference Signal (PRS) strength at the mode II device receiver and small cell size, the geo-location accuracy can be expected to be within ±50 m. Otherwise, the geo-location accuracy could be within ±150 m or less. Furthermore, if the cell ID+TA positioning method is applied, the geo-location accuracy could be assumed to be within a few hundred meters or less based on the cell size (pico eNB, micro eNB, or macro eNB). In case the cell size is a home eNB (HeNB), the accuracy may depend on whether the location of the HeNB is known to the LTE network with some accuracy.

Based on the positioning method (e.g. GPS, E-OTDOA, cell ID+TA), the evolved Serving Mobile Location Center (eSMLC) may work out an estimated positioning error and take this into account in the geo-location accuracy of the mode II device, in one embodiment of the invention.

The mode II device may get the overlapping TVWS resources in the overlapping TVWS channel list, WS2, using LTE cell coverage accuracy in WSM GTA based on its neighbor cell list. In case a more efficient positioning signaling is required by the LTE network to reduce signaling overhead (in 3GPP Rel-9, positioning is meant only for emergency calls, and not for continuous use in tracking the device movements). In case the mode II device cannot do the GPS fix (indoors scenario or battery-powered device may not allow continuous GPS measurements) or RSTD measurements (OTDOA positioning is not supported by the network, or battery-powered device may not allow continuous RSTD measurements).

A further embodiment for the implementation handles co-existence with other secondary cellular systems. In a typical cellular scenario, a situation can happen, where home network cannot be found by an LTE device. In this scenario, the LTE device can look for other LTE cellular networks or other cellular networks such as GERAN or UTRAN provided by the home network operator or other network operators. Then, intra-Radio Access Technology (RAT) handover assuming LTE system or inter-Radio Access Technology (RAT) handover assuming UTRAN or GERAN systems may proceed based on roaming agreement between the home network operators and the other network operators. Possibly, handover could be done between the LTE system and WiMax system based on their deployment and LTE device capability, i.e. a multi-mode device supporting e.g. LTE, GERAN and UTRAN. Hence, the support of intra-RAT (e.g. handover or roaming within the same radio access technology, like within the LTE network) and inter-RAT (e.g. roaming between different radio access technologies, like between LTE and GSM) procedures including device measurements are already specified for cellular technologies (such as for LTE, UTRAN and GERAN).

At the following, we consider the support of the intra-RAT handover on TVWS shared bands. Assuming deployment of an LTE home network and other LTE networks, the mode II device may try to detect the synchronization signals and reference signals transmitted by these other network eNB transmissions on the overlapping TVWS channels based on their eNB IDs as signaled by the MME NAS. Such a way is efficient as the mode II device only needs to try to detect transmissions from a few eNBs (e.g. in LTE, CRS as their name indicate, are cell specific based on eNB IDs) and not exhaustively try every possible cell ID (e.g. LTE has 501 possible cell IDs). The mode II device may select the overlapping TVWS channels with the lowest received signal power from these other-network eNBs to limit interference from other LTE network secondary cellular systems, i.e. based on Primary/Secondary-Synchronisation Channel (P-SCH/S-SCH) detection for time and frequency synchronization and or Cell-specific Reference Signal (CRS)-based Reference Signal Received Power (RSRP) measurement. In another embodiment, the radio access technology of other networks may be other cellular systems such as GERAN or UTRAN, if considered by the industry and regulated for deployment in TVWS bands.

A similar manner may be used if we consider support of inter-RAT handover on TVWS shared bands between LTE home network and other WiFi network. The MME NAS may indicate to the mode II device the pilot sequences used by the WiMax eNBs which are likely to be transmitted on the overlapping TVWS channels based on the mode II device geo-location.

A further embodiment for the implementation of the invention comprises a determination of WSM GTA. The WSM Geographical Tracking Area (WSM-GTA) principle is illustrated in FIG. 1. A WSM-GTA consists of a fixed eNB 11, 14 (numbered as #i where i=1, 2, . . . , N) sharing overlapping TVWS channels (marked as six channels: no. 3 . . . 8). There are two WSM GTAs #1 and #2 shown in FIG. 1. Within coverage of a WSM GTA, there may be mode I 10, 13 and mode II devices 12, 15.

The mode II device indicates its geo-location with its location accuracy based on the localization method (e.g. GPS, cell ID+TA, E-OTD) in channel list query IE to the TVWS database via LTE "proxy". The TVWS database selects available TVWS channels accordingly and indicates the overlapping TVWS channel list within WSM GTA (i.e. available to mode II devices anywhere within WSM GTA), available TVWS channel list (i.e. available to mode II device based on their geo-location and location accuracy), and eNB#i IDs of eNBs within the WSM GTA to the mode II device in the channel list response IE via LTE "proxy". The eNB#i IDs allow seamless use of overlapping TVWS channels by the mode II devices within the WSM GTA. This suits moving mode II devices (i.e. Femto AP on a moving train or generally a device equipped with geo-location and capability to access TVWS and connect to mode I devices), which can use overlapping TVWS channels without need to TVWS channel switch-over. A needed requirement for a mode II device using overlapping TVWS channels is to check its location in every 60 s.

For example, the mode II device 15 in WSM GTA #1 in FIG. 1 may indicate the available TVWS channels as channels 4, 5, 6 and 7, and the used channels are channels 3 and 8, based on reported accuracy as follows:

Accuracy within +1000 m, channels 5, 6 are available (e.g. Macro cell or WSM-GTA accuracy).
Accuracy within +250 m for channels 5, 6, 7 (roughly self-positioned femto eNB/WLAN accuracy).
Accuracy within +150 m for channels 4, 5, 6, 7 (E-OTDA).
Accuracy within +50 m for channels 4, 5, 6, 7 (outdoor GPS accuracy).

The available TVWS channels for the eNB 14 are channels 5 and 6 in this example. The available TVWS channels for the mode I device 13 (the UE) are in this example the same channels as for the mode II device, i.e. channels 4-7. As can be seen from FIG. 1, in this embodiment the allowed Tx power for mode I and mode II devices is equal. As said above, there is no requirement for the geo-location determination for mode I device, while for the mode II device a strict requirement exists in the shown embodiment.

The main advantages of the present invention are the capability to use the LTE network as a "proxy" to allow efficient TVWS-specific MME-NAS and positioning signaling of the mode II device. Furthermore, mode II devices are transparent to the access layer, i.e. no TVWS-specific AS signaling is needed. Furthermore, the overlapping TVWS channel based on the LTE coverage accuracy can re-use the neighbor cell list based on the specified LTE measurements for cellular handover with no additional cost in terms of signaling over the air interface and also regarding to the mode II device implementation. Yet another advantage is that the invention enables practical and flexible allocation of available TVWS channels to the mode II device in case the geo-location accuracy cannot meet the strict FCC requirements. Otherwise, mode II devices can use TVWS channel resources based on its geo-location accuracy. Finally, the LTE "proxy" may further help the mode II device to select TVWS channels with minimum interference from other network secondary systems via co-ordination with other network secondary systems in a new Secondary System TVWS Server entity.

In an embodiment, the apparatuses, method steps (different functionalities of the base stations/nodes) and the computer program according to the invention can be implemented by at least one separate or embedded hardware module in at least one device of the mobile communication network. In one embodiment, the functionalities are implemented in a chipset for different network devices.

A separate or an embedded control unit may perform the above mentioned method steps where applicable. In an embodiment, the apparatus comprises a memory, and at least one processor configured to execute applicable method steps according to the invention. Furthermore, the method according to the invention can be implemented with one or several computer programs which are executed by the at least one processor. The computer program(s) can be stored on at least one computer readable medium such as, for example, a memory circuit, memory card, magnetic or optical disk. Some functional entities may be implemented as program modules linked to another functional entity. The functional entities may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware arts. For example, the functionality of one or more of the components of the exemplary embodiments can be implemented via one or more hardware devices.

The exemplary embodiments can store information relating to various processes described herein.

This information can be stored in one or more memories, such as a hard disk, optical disk, magneto-optical disk, RAM, and the like. One or more databases can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical arts.

As stated above, the components of the exemplary embodiments can include computer readable medium or memories according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present invention are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   requesting data of available television white space channels in a geographical tracking area by a television band device;
   identifying available television white space channels and base stations of at least one cell within the geographical tracking area, wherein the available television white space channels are identified according to a positioning method comprising an associated accuracy and a corresponding estimated position error;
   determining available overlapping television white space channels based on at least a geo-location accuracy of the apparatus and a cell neighbor list; and
   defining and allocating at least one available television white space channel for the television band device as a response for the request.

2. The method according to claim 1, the method further comprising:
   checking co-existence of cellular secondary systems in the geographical tracking area.

3. The method according to claim 1, the method further comprising:
   evaluating the request according to its geographical tracking area filtering rule using the cell neighbor list; and
   connecting to the television white space database on behalf of the television band device to request a list of available television white space channels or overlapping television white space channels in the geographical tracking area.

4. The method according to claim 1, the method further comprising:
   configuring network resources for the base station based on the location of the base station, the cell neighbor list and interfering other network base stations in an overlapping television white space channel.

5. The method according to claim 1, the method further comprising:
   selecting a television white space channel for the television band device where a lowest signal power transmitted from other network base stations is received.

6. The method according to claim 1, the method further comprising:
   locating the position of a television band device by Global Positioning System, by Evolved Observed Time Difference Of Arrival or by cell Identity and Timing Advance method.

7. The method according to claim 6, the method further comprising:
   checking the location for a mode II device between predetermined periods of time; and
   defining the at least one available television white space channel for the mode II device based on location accuracy.

8. An apparatus, comprising:
   receiving means configured to receive a request of available television white space channels in a geographical tracking area, from at least one television band device;
   processing means configured to identify available television white space channels and base stations of at least one cell within the geographical tracking area, wherein the available television white space channels are identified according to a positioning method comprising an associated accuracy and a corresponding estimated position error;
   the processing means further configured to determine available overlapping television white space channels based on at least a geo-location accuracy of the apparatus and a cell neighbor list; and
   the processing means configured to define and allocate at least one available television white space channel for the television band device as a response for the request.

9. The apparatus according to claim 8, comprising:
   secondary user co-ordination means configured to co-ordinate cellular secondary user co-existence on television white space channels at the geographical tracking area.

10. The apparatus according to claim 8, comprising:
    the processing means configured to evaluate the request according to its geographical tracking area filtering rule using the cell neighbor list; and
    the apparatus configured to connect to the television white space database on behalf of the television band device to request a list of available television white space channels or overlapping television white space channels in the geographical tracking area.

11. The apparatus according to claim 8, comprising:
    configuring means for configuring network resources for the base station based on the location of the base station, the cell neighbor list and interfering other network base stations in an overlapping television white space channel.

12. The apparatus according to claim 8, comprising:
    the apparatus configured to select a television white space channel for the television band device where a lowest signal power transmitted from other network base stations is received.

13. A network, comprising:
    at least one base station;
    at least one television band device; and
    an apparatus for television white space mapping for the at least one television band device, the apparatus comprising:
    receiving means configured to receive a request of available television white space channels in a geographical tracking area, from at least one television band device;
    processing means configured to identify available television white space channels and base stations of at least one cell within the geographical tracking area, wherein the available television white space channels are identified according to a positioning method comprising an associated accuracy and a corresponding estimated position error;
    the processing means configured to determine available overlapping television white space channels based on at least a geo-location accuracy of the apparatus and a cell neighbor list; and the processing means configured to define and allocate at least one available television white space channel for the television band device as a response for the request.

14. The network according to claim 13, further comprising:
a secondary system television white space server connectable with the apparatus, the server configured to co-ordinate cellular secondary user co-existence on television white space channels at the geographical tracking area.

15. The network according to claim 13, the network further comprising:
positioning means configured to locate the television band device by Global Positioning System, by Evolved Observed Time Difference Of Arrival or by cell Identity and Timing Advance method.

16. The network according to claim 15, further comprising:
the positioning means configured to check the location for a mode II device between predetermined periods of time; and
the apparatus configured to define the at least one available television white space channel for the mode II device based on location accuracy.

17. A computer program product comprising at least one non-transitory computer-readable storage medium having computer-executable program code portions stored therein, the computer-executable program code portions comprising program code instructions for:
requesting data of available television white space channels in a geographical tracking area by a television band device;
identifying available television white space channels and base stations of at least one cell within the geographical tracking area, wherein the available television white space channels are identified according to a positioning method comprising an associated accuracy and a corresponding estimated position error;
determining available overlapping television white space channels based on at least a geo-location accuracy of the apparatus and a cell neighbor list; and
defining and allocating at least one available television white space channel for the television band device as a response for the request.

* * * * *